US007339913B2

(12) United States Patent
Chou et al.

(10) Patent No.: US 7,339,913 B2
(45) Date of Patent: Mar. 4, 2008

(54) METHOD AND SYSTEM OF NETWORK MANAGEMENT AND SERVICE PROVISIONING FOR BROADBAND WIRELESS NETWORKS

(75) Inventors: Joey Chou, Scottsdale, AZ (US); Shlomo Ovadia, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 597 days.

(21) Appl. No.: 10/919,544

(22) Filed: Aug. 17, 2004

(65) Prior Publication Data

US 2006/0039313 A1    Feb. 23, 2006

(51) Int. Cl.
*H04Q 7/24* (2006.01)
(52) U.S. Cl. .............. 370/338; 370/328; 370/401; 455/422.1; 455/435.1; 709/223
(58) Field of Classification Search ........... 370/328, 370/338, 352, 401, 329, 229, 235–236; 455/403, 455/422.1, 426.1, 558, 432.1–433, 435.1, 455/435, 445, 450, 452.1, 507, 514, 517; 709/201, 203, 217–219, 223, 225, 238, 249
See application file for complete search history.

(56) References Cited

U.S. PATENT DOCUMENTS

| | | | |
|---|---|---|---|
| 6,636,505 B1 * | 10/2003 | Wang et al. ................ 370/352 |
| 6,708,207 B1 * | 3/2004 | Sabelhaus et al. ........... 709/223 |
| 6,826,166 B2 * | 11/2004 | Yokoyama ................. 370/338 |
| 2002/0065907 A1 | 5/2002 | Cloonan et al. |
| 2002/0132611 A1 * | 9/2002 | Immonen et al. ........... 455/414 |
| 2002/0159411 A1 | 10/2002 | Airy et al. |
| 2003/0231649 A1 * | 12/2003 | Awoseyi et al. ............ 370/463 |
| 2004/0048613 A1 * | 3/2004 | Sayers et al. ............ 455/426.2 |
| 2004/0063497 A1 | 4/2004 | Gould |
| 2004/0242233 A1 * | 12/2004 | Lutgen ...................... 455/445 |
| 2005/0058062 A1 * | 3/2005 | Rudolf et al. .............. 370/216 |

(Continued)

OTHER PUBLICATIONS

Drake, P., "Using SNMP to Manage Networks," Conference Proceedings Article, 1991, pp. 1-4.

(Continued)

*Primary Examiner*—George Eng
*Assistant Examiner*—Kamran Afshar
(74) *Attorney, Agent, or Firm*—Blakely, Sokoloff, Taylor & Zafman LLP

(57) ABSTRACT

A method and system for network management and service provisioning for broadband wireless networks. The method and system employ a network management system (NMS) to manage nodes corresponding to base stations (BS) and subscriber stations (SS). A service flow database is used to store data relating to pre-provisioned dynamic service flows for subscribers having service agreements with a service provider for the broadband wireless network. Management Information Bases (MIBs) are hosted by the various BSs in the network, along with the SSs. The MIBs contain tabulated data that is used to define and provision dynamic service flows. The MIBs are structured to enable management of the MIBs via Simple Network Management Protocol (SNMP) messaging and SNMP agents operating on the SNMP managed nodes for the BSs and SSs. The provisioning technique associates sets of Quality of Service (Qos) parameters with corresponding service classes, enabling a set of QoS parameters for a given dynamic service flow to be identified by the corresponding service class.

26 Claims, 10 Drawing Sheets

U.S. PATENT DOCUMENTS

| | | | |
|---|---|---|---|
| 2005/0080886 A1* | 4/2005 | Croy et al. | 709/223 |
| 2005/0089052 A1* | 4/2005 | Chen et al. | 370/401 |
| 2005/0094663 A1* | 5/2005 | Rahman et al. | 370/466 |
| 2005/0185622 A1* | 8/2005 | Svensson et al. | 370/338 |
| 2005/0185656 A1* | 8/2005 | Svensson et al. | 370/398 |
| 2005/0232186 A1* | 10/2005 | Karaoguz et al. | 370/328 |
| 2005/0233693 A1* | 10/2005 | Karaoguz et al. | 455/3.06 |
| 2005/0262229 A1* | 11/2005 | Gattu et al. | 709/223 |
| 2005/0271021 A1* | 12/2005 | Alemany et al. | 370/338 |
| 2006/0111111 A1* | 5/2006 | Ovadia | 455/439 |
| 2006/0160533 A1* | 7/2006 | Chou et al. | 455/422.1 |
| 2006/0160536 A1* | 7/2006 | Chou | 455/435.1 |
| 2006/0294214 A1* | 12/2006 | Chou | 709/223 |

OTHER PUBLICATIONS

Cheng, L., "Wireless Awareness for Wireless Intelligent Network," APCC 2003, Sep. 21, 2003, pp. 561-564.

IEEE Computer Society and the IEEE Microwave Theory and Techniques Society, "Part 16: Air Interface for Fixed Broadband Wireless Access System," IEEE Std 802.16-2004, Jun. 2004. http://ieeexplore.ieee.org/xpl/standardstoc.jsp?isnumber=29691&isYear=2004.

PCT/US2005/027063, PCT International Search Report and Written Opinion, Nov. 30, 2005.

* cited by examiner

Fig. 4a wmanIfBsProvisionedSfTable

| sfIndex | SS MAC Addr | QoS Index | Direction | ... |
|---|---|---|---|---|
| 100001 | 123ab54 | 1 | D | |
| 100002 | 123ab54 | 2 | U | |
| 100003 | 45feda1 | 1 | D | |
| 100004 | 45feda1 | 2 | U | |

D-Downlink   U-Uplink

Fig. 4b

| QoS Index | Service Class | Traffic Priority | Max Rate | Max Burst | Min Rate | Jitter | Max Latency | ... |
|---|---|---|---|---|---|---|---|---|
| 1 | Gold | 3 | 2000000 | 4M | 200000 | 2.5 | 50 | ... |
| 2 | Silver | 4 | 1000000 | 2M | 100000 | 5 | 100 | ... |
| 3 | Bronze | 6 | 512000 | 1M | 50000 | 10 | 150 | ... | wmanIfBsServiceClassTable

Fig. 4c

| sfIndex | Src IP Addr | Dest IP Addr | TOS/DSCP | ... |
|---|---|---|---|---|
| 100001 | | 1.0.1.48 | | |
| 100003 | | 1.0.1.45 | | |
| 115455 | 6.12.6.4 | | | |
| 100002 | 6.12.6.5 | | 7 | |
| 100004 | 6.12.6.6 | | 4 | | wmanIfBsClassifierRuleTable

Fig. 4d wmanIfBsRegisteredSsTable (460)

| ssIndex (462) | ifIndex (464) | SS MAC Addr (466) | ... |
|---|---|---|---|
| 200 | 1 | 123ab54 | |
| 201 | 2 | 45feda1 | |
| 203 | 2 | 245ad56 | |

Fig. 4e wmanIfCmnCpsServiceFlowTable (480)

| sfIndex (482) | sfCid (484) | Dir. (485) | QoS Index (486) | SF State (487) | Service Class (488) | Traffic Priority (489) | Max Rate (490) | Max Burst (491) | Min Rate (492) | Jitter (493) | Max Latency (494) | ... |
|---|---|---|---|---|---|---|---|---|---|---|---|---|
| 100001 | 101 | D | 1 | 1 | Gold | 3 | 2000000 | 4M | 200000 | 2.5 | 50 | |
| 100002 | 102 | U | 2 | 2 | Silver | 4 | 1000000 | 2M | 100000 | 5 | 100 | |
| 100003 | 053 | D | 1 | 1 | Gold | 3 | 2000000 | 4M | 200000 | 2.5 | 50 | |
| 100004 | 054 | U | 2 | 2 | Silver | 4 | 1000000 | 2M | 100000 | 5 | 100 | |

METHOD AND SYSTEM OF NETWORK MANAGEMENT AND SERVICE PROVISIONING FOR BROADBAND WIRELESS NETWORKS

FIELD OF THE INVENTION

The field of invention relates generally to wireless communication networks and, more specifically but not exclusively relates to a method and system of network management and service provisioning for broadband wireless networks.

BACKGROUND INFORMATION

IEEE (Institute of Electrical and Electronic Engineers) 802.16 is an emerging suite of air interface standards for combined fixed, portable and Mobile Broadband Wireless Access (MBWA). Initially conceived as a radio standard to enable cost-effective last-mile broadband connectivity to those not served by wired broadband such as cable or DSL, the specifications are evolving to target a broader market opportunity for mobile, high-speed broadband applications. The IEEE 802.16 architecture not only addresses the traditional "last mile" problem, but also supports nomadic and mobile clients on the go. The MBWA architecture is being standardized by the IEEE 802.16 Working Group and the Worldwide Interoperability for Microwave Access (WiMAX) forum. For convenience, the terms 802.16 and WiMAX are used interchangeably throughout this specification to refer to the IEEE 802.16 suite of air interface standards.

FIG. 1 shows a simplified broadband wireless network with point-to-multipoint (PMP) architecture for operation at both licensed and licensed-exempt frequency bands typically below 11 GHz. Other types of architectures (not shown) such as mesh broadband wireless networks are permissible. A backbone IP (Internet Protocol) network 100 is connected to a broadband wireless network using radio access nodes (RANs) 102A and 102B. Each RAN is connected via a wired link such as an optical fiber (depicted as optical fiber links 103A, 103B and 103C) or point-to-point wireless link (not shown) to one or more radio cells (depicted between RAN 102A or 102B to radio cells 104A, 104B, and 104C). At the hub of a radio cell is a respective Base station (BS) 106A, 106B, and 106C. A Base Station system includes an advanced antenna system (AAS), which is typically located on top of a radio tower and is used to transmit high-speed data to multiple subscriber stations (SSs) 108 and receive data from the subscriber stations via unidirectional wireless links 110 (each SS uplink transmission is independent on the others). More particularly, each SS 108 can access network 100 (via an appropriate BS) using the PHY+MAC (Physical+Media Access Control) layer features defined by the IEEE P802.16 air-interface standard. An SS may correspond to a fixed subscriber location (e.g., in a home or office), or may correspond to a mobile subscriber who might access the broadband wireless network via a mobile device such as a personal digital assistant (PDA), laptop computer, etc. A fixed SS typically uses directional antenna while a mobile or portable SS usually uses an omni-directional antenna.

Transmission of data bursts from network 100 to an SS 108 proceeds in the following manner. The data bursts such as IP packets or Ethernet frames are encapsulated in IEEE 802.16-2004 data frame format and forwarded from an appropriate RAN to an appropriate BS within a given cell. The BS then transmits non-line of sight (NLOS) data to each SS 108 using a unidirectional wireless link 110, which is referred to as a "downlink." Transmission of data from an SS 108 to network 100 proceeds in the reverse direction. In this case, the encapsulated data is transmitted from an SS to an appropriate BS using a unidirectional wireless link referred to as an "uplink." The data packets are then forwarded to an appropriate RAN, converted to IP Packets or Ethernet frames, and transmitted henceforth to a destination node in network 100. Data bursts can be transmitted using either Frequency-Division-Duplexing (FDD) or Time-Division-Duplexing (TDD) schemes. In the TDD scheme, both the uplink and downlink share the same RF channel, but do not transmit simultaneously, and in the FDD scheme, the uplink and downlink operate on different RF channels, sometimes simultaneously.

Multiple BSs are configured to form a cellular-like wireless network. A network that utilizes a shared medium requires a mechanism to efficiently share it. Within each cell, the wireless network architecture is a two-way PMP, which is a good example of a shared medium; here the medium is the space (air) through which the radio waves propagate. The downlink, from the base station (BS) to an SS, operates on a PMP basis. Provisions within the IEEE 802.16-2004 standard include a central BS with AAS within each cell. Such an AAS includes a sectorized antenna that is capable of handling multiple independent sectors simultaneously. Under this type of configuration, the operations of base stations described below may be implemented for each of the independent sectors, such that multiple co-located base stations with multiple sector antennas sharing a common controller may be employed in the network. Within a given frequency channel and antenna sector, all stations receive the same transmission, or parts thereof.

In the other direction, the subscriber stations share the uplink to the BS on a demand basis. Depending on the class of service utilized, the SS may be issued continuing rights to transmit, or the right to transmit may be granted by the BS after receipt of a request from an SS. In addition to individually-addressed messages, messages may also be sent on multicast connections (control messages and video distribution are examples of multicast applications) as well as broadcast to all stations. Within each sector, users adhere to a transmission protocol that controls contention between users and enables the service to be tailored to the delay and bandwidth requirements of each user application.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 4a shows an exemplary configuration for a wireless MAN (metropolitan area network) base station (BS) provisioned service flow table corresponding to the wmanIfBsProvisionedSfTable object of FIG. 3, according to one embodiment of the invention;

FIG. 4b shows an exemplary configuration for a wireless MAN BS service class table corresponding to the wmanIfBsServiceClassTable object of FIG. 3, according to one embodiment of the invention;

FIG. 4c shows an exemplary configuration for a wireless MAN BS classifier rule table corresponding to the wmanIfBsClassifierRuleTable object of FIG. 3, according to one embodiment of the invention;

FIG. 4d shows an exemplary configuration for a wireless MAN BS registered subscriber station table corresponding to the wmanIfBsRegisteredSsTable object of FIG. 3, according to one embodiment of the invention;

FIG. 4e shows an exemplary configuration for a wireless MAN common service flow table corresponding to the wmanIfCmnCpsServiceFlowTable object of FIG. 3, according to one embodiment of the invention;

DETAILED DESCRIPTION

Embodiments of a method and system of network management and service provisioning for broadband wireless networks are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

An important aspect of WiMAX networks is service provisioning. To enable end-user access to a WiMAX network, the user's SS and service flows (i.e., unidirectional flow of MAC service data units on a connection with a particular quality of service (QoS)) must be provisioned. Unlike the limited QoS support provided by the more simplistic Wi-Fi (i.e., IEEE 802.11) networks commonly used to provide wireless network access in today's environments, the IEEE 802.16 architecture supports a rich set of QoS features. Furthermore, WiMAX employs a more sophisticated wireless air interface than does Wi-Fi, thus requiring more complex service provisioning considerations.

More specifically, WiMAX is based on a centralized control architecture, where the scheduler in the BS has complete control of the wireless media access among all SS's. WiMAX can simultaneously support multiple wireless connections that are characterized with a complete set of QoS parameters. Moreover, WiMAX provides the packet classifier to map these connections with various user applications and interfaces, ranging from Ethernet, TDM (Time-Division Multiplexing), ATM (Asynchronous Transfer Mode), IP (Internet Protocol), VLAN (Virtual Local Area Network), etc. However, the rich feature set and flexibility in WiMAX also increases the complexity in the service deployment and provisioning for fixed and mobile broadband wireless access networks.

Figure 1:
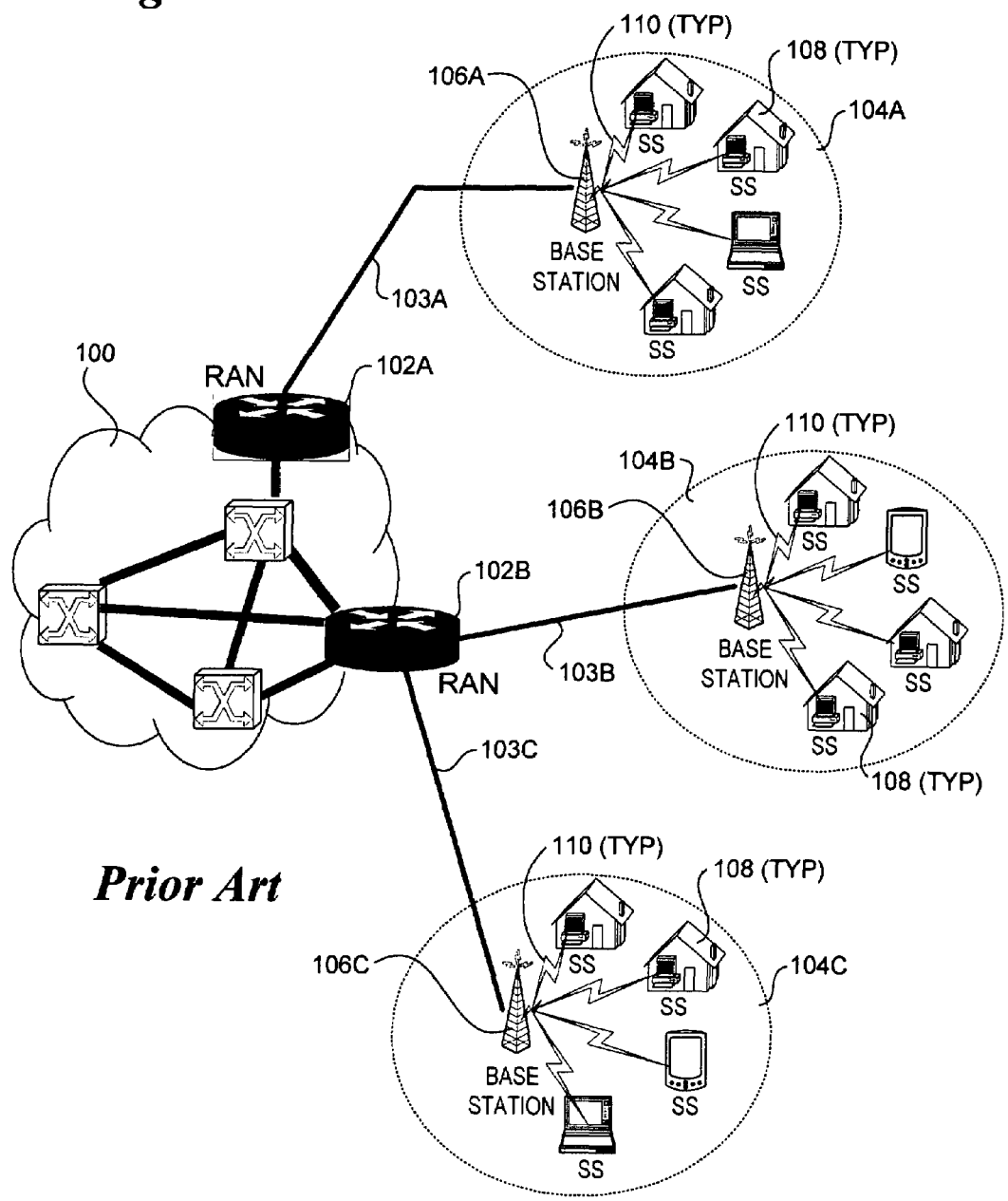
FIG. 1 is a schematic diagram of an exemplary broadband wireless network with point-to-multipoint topology based on the IEEE 802.16 suite of standards.
Figure 2:
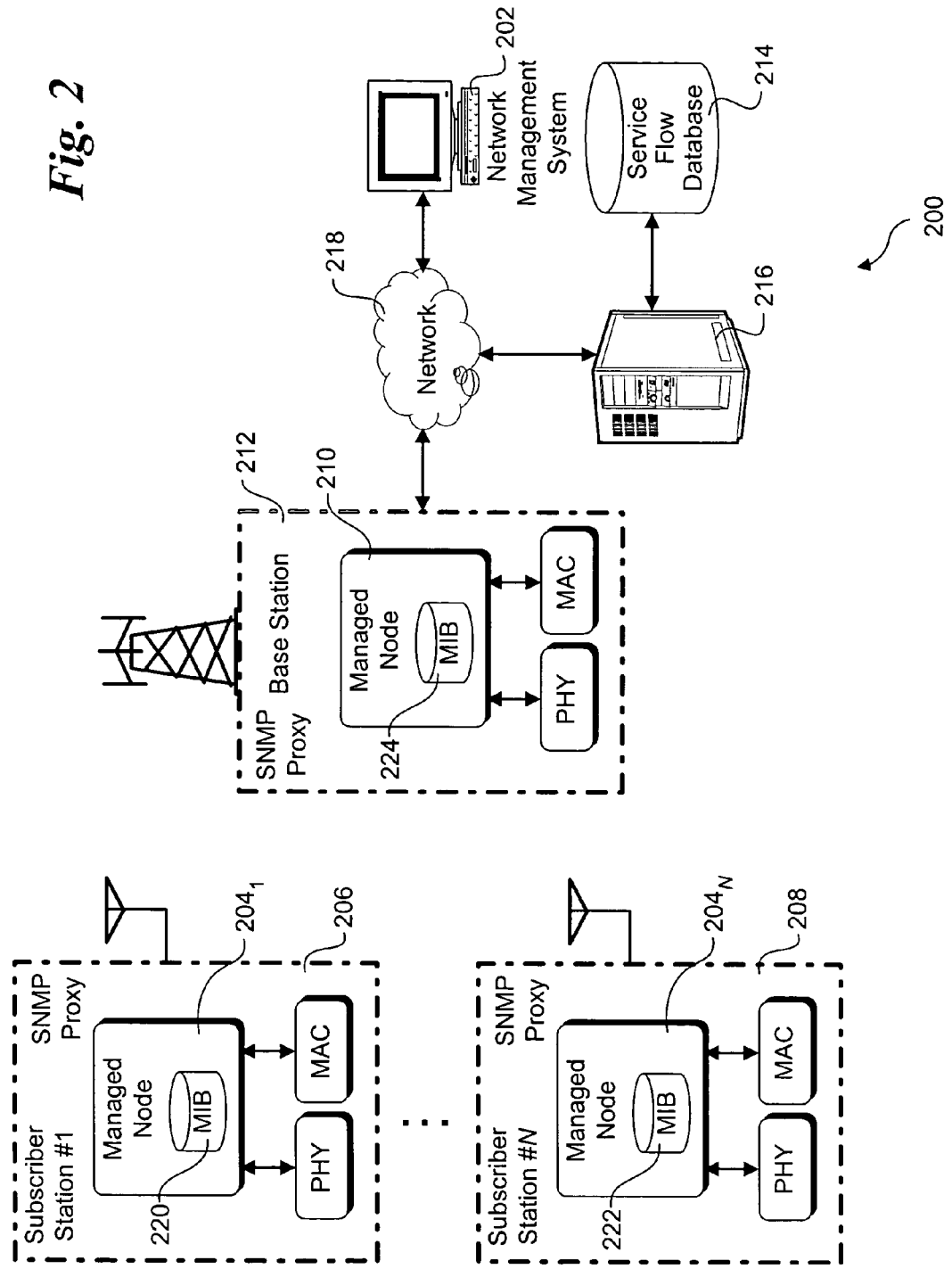
FIG. 2 is a schematic diagram of a management reference model for Broadband Wireless Access networks, according to one embodiment of the invention.

FIG. 2 shows a management reference model 200 of Broadband Wireless Access (BWA) networks, according to one embodiment of the invention. The model includes a Network Management System (NMS) 202, managed nodes (depicted as managed nodes $204_1$ and $204_N$ for exemplary subscriber stations 1 (206) and N (208) and a managed node 210 for a base station 212), and a Service Flow Database 214 hosted by a database server 216. The NMS 202 and Service Flow Database are linked in communication to the WiMAX network's BSs (e.g., base station 212) via a network 218, which may typically be a wide-area network (WAN) or the Internet). BS and SS managed nodes collect and store managed objects in an 802.16 Management Information Base (MIB) format, as depicted by MIB instances 220, 222, and 224. In one embodiment, managed objects are made available to NMSs (e.g., NMS 202) using the Simple Network Management Protocol (SNMP) as specified by IETF RFC (request for comments) 1157 (i.e., http://www.faqs.org/rfcs/rfc1157.html).

The Service Flow Database 214 contains the service flow and the associated QoS information that directs the BS and SS in the creation of transport connections when a service is provisioned, an SS enters the WiMAX network, or a mobile SS roams into a BS coverage area. In general, SSs can be managed directly from an NMS, or indirectly through a BS that functions as an SNMP proxy. In one embodiment, the management information between as SS and a BS is carried over a Second Management CID (connection Identifier) for a managed SS. If the Second Management CID does not exist, the SNMP message may go through another interface provided by the customer premise equipment.

There are three types of service flows defined by the IEEE 802.16-2004 standard, including provisioned service flows, admitted service flows, and active service flows. A provisioned service flow is a service flow that is provisioned but not immediately activated. External triggers are use to transition a provisioned service flow to an admitted service flow. This service flow is initiated when an SS enters the network through a network entry procedure, with provision commands being managed by the NMS.

Under an admitted serve flow, a network resource is reserved through admission control. External triggers are used to transition an admitted service flow to an active service flow. Events similar to "off-hook" in a telephony model are employed to activate an unsolicited grant service (UGS) service flow. Application triggers may also be employed to effect the transition to an active service flow.

An active service flow is a service flow that is active. That is, it is a service flow that is granted uplink and downlink bandwidth for data transport usage. It employs an active QoS parameter set that is a subset of the Admitted QoS parameter set.

SNMP is based on the manager/agent model consisting of a manager, an agent, a database of management information, managed objects and the network protocol. The manager executes management applications that monitors and control managed network. The agent is a management software module that resides in a managed device to execute the commands from the manager.

The manager and agent use a Management Information Base (MIB) and a relatively small set of commands to exchange information. The MIB is organized in a tree structure with individual variables, such as point status or description, being represented as leaves on the branches.

Figure 3:
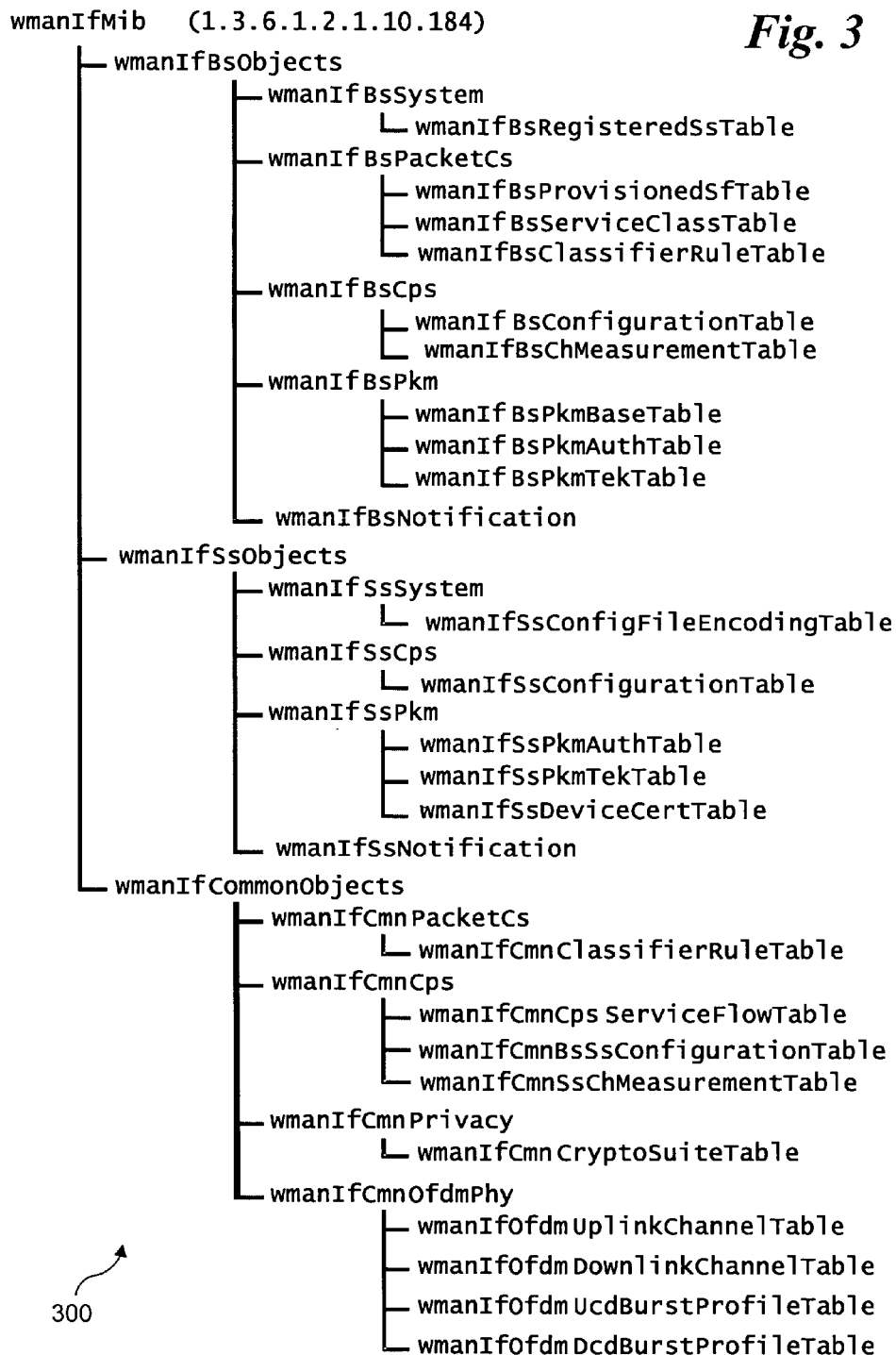
FIG. 3 is a schematic representation of a Management Information (data)Base (MIB) structure employed in the management reference model of FIG. 2 to facilitate provisioning and management operations.

FIG. 3 shows a wmanIfMib (wireless MAN interface) MIB data structure 300, according to one embodiment. The MIB data structure includes multiple MIB objects nested at various levels (groups) in an object hierarchy. At the top of the hierarchy is the wmanifMib object. The next hierarchy level includes the wmanifBsObjects, the wmanIfSsobjects, and the wmanIfCommonObjects. The wmanifBsObjects include a group of managed objects to be implemented by a base station. Similarly, the wmanIfSsobjects include a group of managed objects to be implemented by a subscriber station. The wmanIfCommonObjects include a group of common managed objects to be implemented in base stations and the subscriber stations. In connection with other SNMP management operations, wmanIfMib MIB data structure 300 may be implemented as a sub-tree under the Interfaces Group MIB defined in RFC (request for comment) 2863 (i.e., http://www.faqs.orq/rfcs/rfc2863.html).

FIG. 4a shows an exemplary configuration of a BS provisioned service flow table (wmanIfBsProvisionedSfTable 400), according to one embodiment of the MIB data structure 300. This table contains the pre-provisioned dynamic service flow information to be used to create connections when a user enters the network. In includes an sfIndex field 402, an SS MAC address field 404, a QoS Index field 406, and a Direction field 408, among other fields (not shown). The sfIndex field 402 is used as an index to link table rows to other tables in the database. A corresponding dynamic service flow state value (provisioned, admitted, or activated) is stored in a linked table (not shown) for each index entry. The SS MAC address field 404 contains a unique SS identifier to associate the dynamic service flow with an SS. The QoS Index field 406 stores a pointer (index) to the QoS parameter set for the corresponding service flow. The Direction field 408 defines the direction of the service flow (e.g., uplink (UL) or downlink (DL)).

FIG. 4b shows an exemplary configuration for a BS service class table (wmanIfBsServiceClassTable 420), according to one embodiment of the MIB data structure 300. This table contains the QoS parameters that are associated with service flows. The illustrated fields include a QoS Index field 422, a Service Class field 424, a Traffic Priority field 426, a Maximum Sustained Data Rate field 428, a Maximum Traffic Burst field 430, a Minimum Reserved Rate field 532, a Tolerated Jitter field 434, and a Maximum Latency field 436. The QoS Index field 422 is analogous to QoS Index field 406, and stores a pointer (index) to the QoS parameter set for the corresponding dynamic service flow. The Service Class field 424 stores a service class name. In one embodiment, the level of service class names are linked to respective sets of QoS parameters, such that a particular set of commonly used QoS parameters may be identified by simply entering a corresponding service class name.

The Traffic Priority field 426 contains a value (e.g., 0 . . . 7) that specifies the priority assigned to a service flow. When two service flows have identical QoS parameters besides priority, the higher priority service flow should be given lower delay and higher buffering preference. The Maximum Sustained Data Rate field 428 specifies the peak data rate of the dynamic service flow in bits per second. The Maximum Traffic Burst field 430 specifies the maximum burst size that can be transported. The Minimum Reserved Rate field 432 is used to specify a rate in bits per second that specifies the minimum amount of data to be transported on the service flow when averaged over time. The Tolerated Jitter field 434 is used to specify the maximum frequency delay variation (jitter) for the service flow. The Maximum Latency field 436 specifies the maximum latency between the reception of a packet by the BS or SS on its network interface and the forwarding of the packet to its radio frequency (RF) interface.

FIG. 4c shows an exemplary configuration for a BS classifier rule table (wmanIfBsClassifierRuleTable 440), according to one embodiment of the MIB data structure 300. This table contains rules for the packet classifier to map downlink and uplink packets to the dynamic service flow. The table's fields include an sfIndex field 442 (analogous to sfIndex field 402), a Source IP Address field 444 in which the IP address for a source endpoint is stored, a Destination IP Address field 446, in which the IP address for a destination endpoint is stored, and a Type of Service (TOS)/Differentiated Service Code Point (DSCP) field 448, in which a TOS or DSCP parameter is stored. In the downlink direction, when a packet is received from the network, the classifier in the BS may use the MAC address or IP address to determine which SS the packet shall be forwarded to, and may use TOS or DSCP parameters to select the dynamic service flow with a suitable QoS. In the uplink direction, when a packet is received from the customer premise, the classifier in the SS may use the source/destination MAC address or IP address and port number, TOS/DSCP, Virtual Local Area Network (VLAN) ID to forward the packet to a service flow with the appropriate QoS support.

FIG. 4d shows an exemplary configuration of a BS registered SS table (wmanIfBsRegisteredSsTable 460), according to one embodiment of the MIB data structure 300. This table includes information corresponding to registered SSs. The illustrated fields include an sfIndex field 462, which contains an index to a subscriber station identifier, and an ifIndex field 464, which contains in interface index into an MIB instance. An SS MAC address field 466 is used to store the MAC address for a subscriber station.

FIG. 4e shows an exemplary configuration of a common dynamic service flow table (wmanIfCmnCpsServiceFlowTable 480), according to one embodiment of the MIB data structure 300. This table includes a service flow index (sfIndex) field 482, a service flow connection identifier (sfCid) field 484, a Direction Field 485, a QoS Index field 486, and a service flow state field 487. The remaining fields shown are analogous to like-named field in the smanIfBsServiceClassTable 420, and include a Service Class Name field 488, a Traffic Priority field 489, a Maximum Sustained Data Rate field 490, a Maximum Traffic Burst field 491, a Minimum Reserved Rate field 492, a Tolerated Jitter field 493, and a Maximum Latency field 494. These fields are populated with the same QoS parameters stored in wmanIfBsServiceClassTable 420 corresponding to their associated service class name. In addition to the illustrated fields, the smanIfCmnCpsServiceFlowTable may contain other fields that are not shown.

Figure 5:
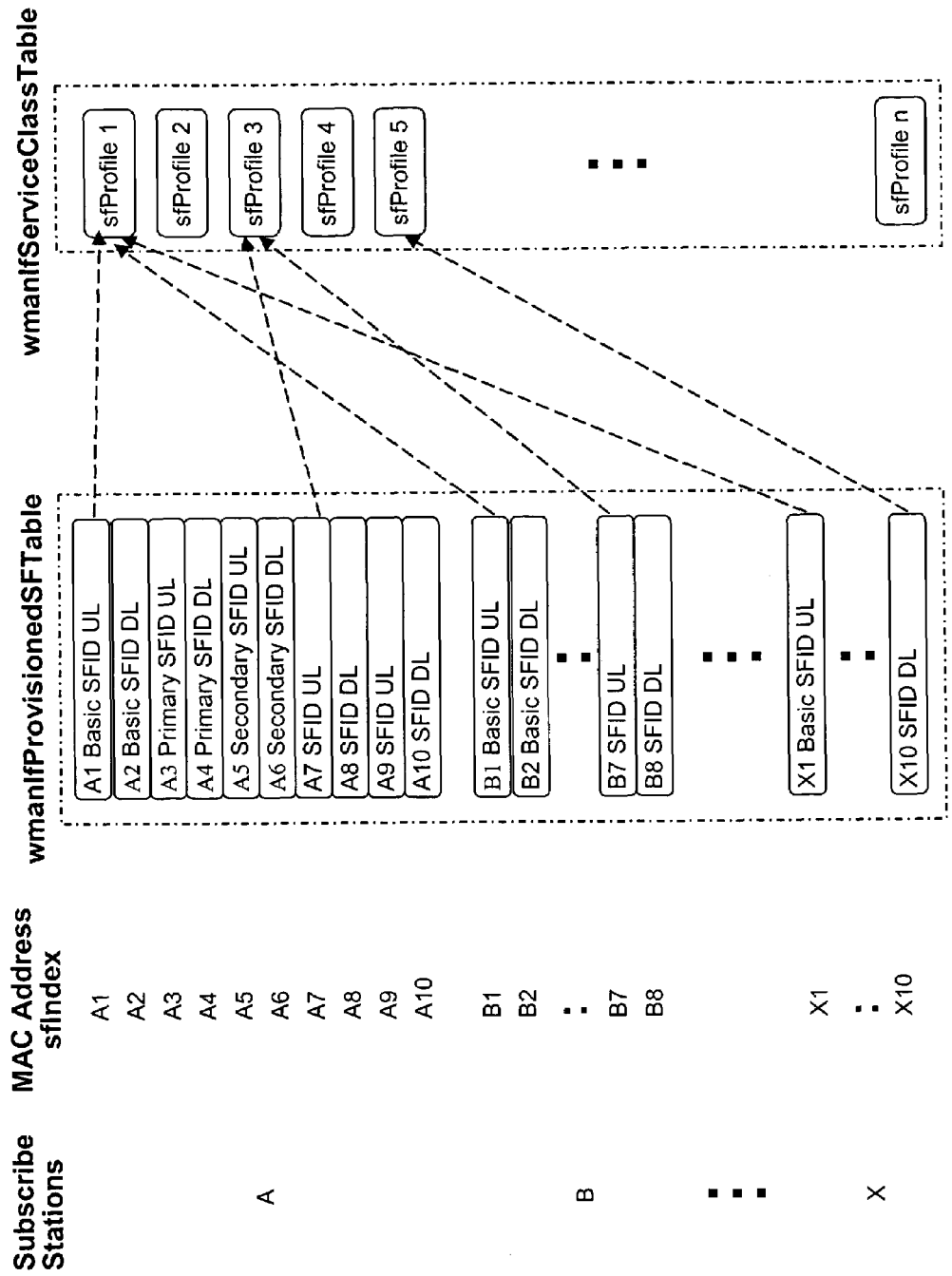
FIG. 5 is a schematic diagram illustrating a scheme via which service classes may be provisioned, according to one embodiment of the invention.

To facilitate the NMS task of provisioning dynamic service flow attributes for hundreds or even thousands of subscriber stations supported by each BS, the concept of Provisioned Service Classes has been devised. FIG. 5 shows one embodiment of a provisioned service class scheme, wherein QoS profiles (e.g., service classes) are created to define associated service flow attributes that can be shared by multiple service flows. For example, Basic CID UL for SSs A1, B1, and X1 uses service profile 1. Service flow attribute profiles can be added or deleted dynamically to meet different QoS demands from subscribers.

Figure 6:
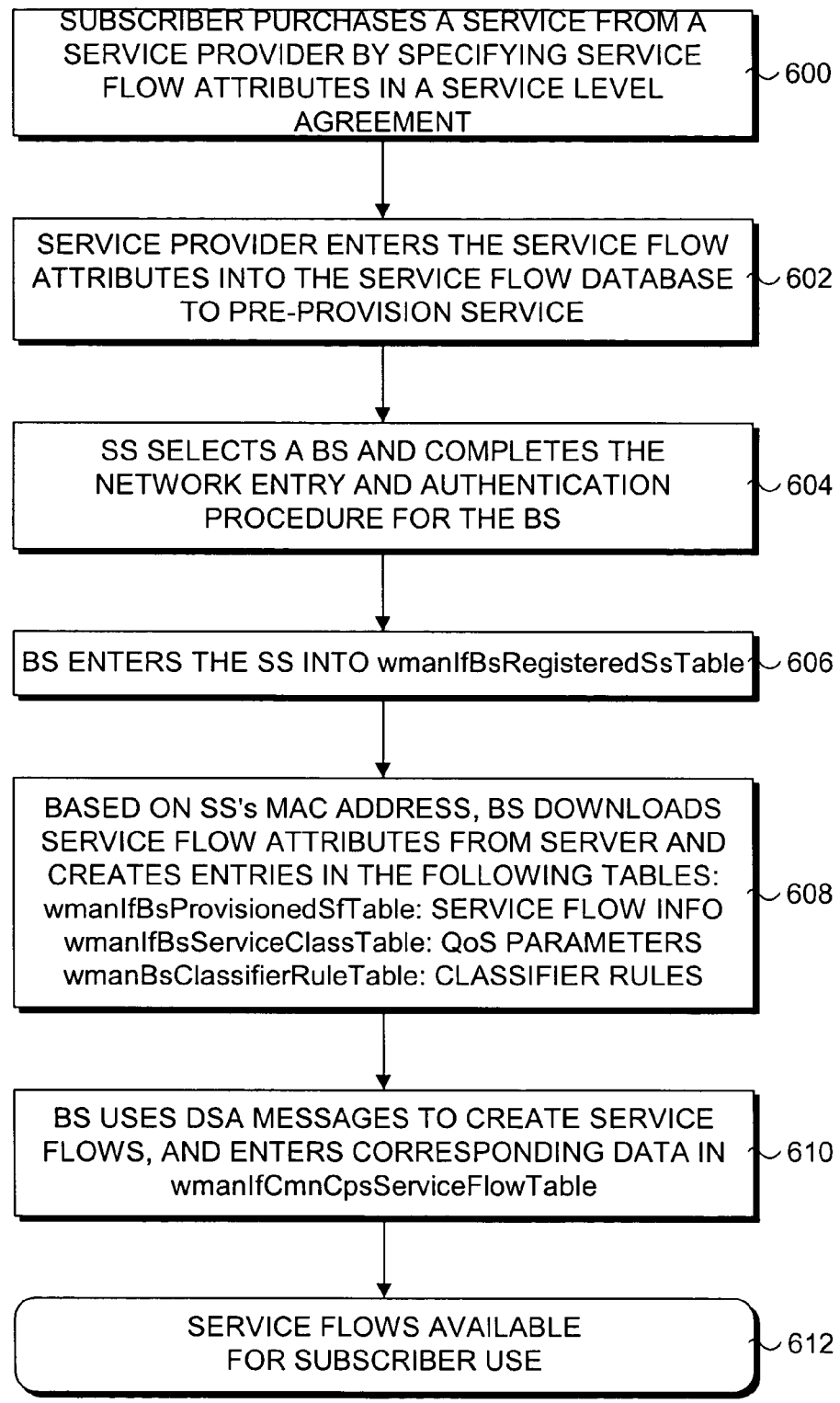
FIG. 6 is a flowchart illustrating operations performed during provisioning service flows for a subscriber station, according to one embodiment of the invention

FIG. 6 shows a flowchart illustrating operations performed to provision dynamic service flows for a subscriber, according to one embodiment of the invention. The process begins in a block 600, wherein the subscriber purchases a broadband wireless service from a service provider by specifying dynamic service flow attributes in a service level agreement. When a customer subscribes to the service, he or she will tell the service provider the dynamic service flow information corresponding to the desired level of service, including the number of UL/DL connections that are requested, along with the data rates and QoS parameters for those connections, and along with what kind of applications (e.g., Internet, voice, video, etc.) he or she intends to run. In response to the subscriber entries, the service provider will pre-provision the services by entering the corresponding dynamic service flow attributes in Service Flow Database 216, as shown in a block 602.

In a block 604, the SS selects a BS (or a BS is automatically identified in the case of a mobile user) and completes the network entry and authentication procedure for the BS. In response, the BS enters the SS into its wmanifBsRegisteredSsTable 460 in a block 606 and downloads corresponding service flow attributes, based on the subscriber station's MAC address, from Service Flow Database 214 via server 216 and network 218 in a block 608. The smanIfBsProvisionedSfTable is then populated with the corresponding service flow information, while corresponding QoS parameters are entered in the wmanIfBsServiceClassTable and corresponding classifier rules are entered in the wmanBsClassifierRuleTable.

Figure 7:
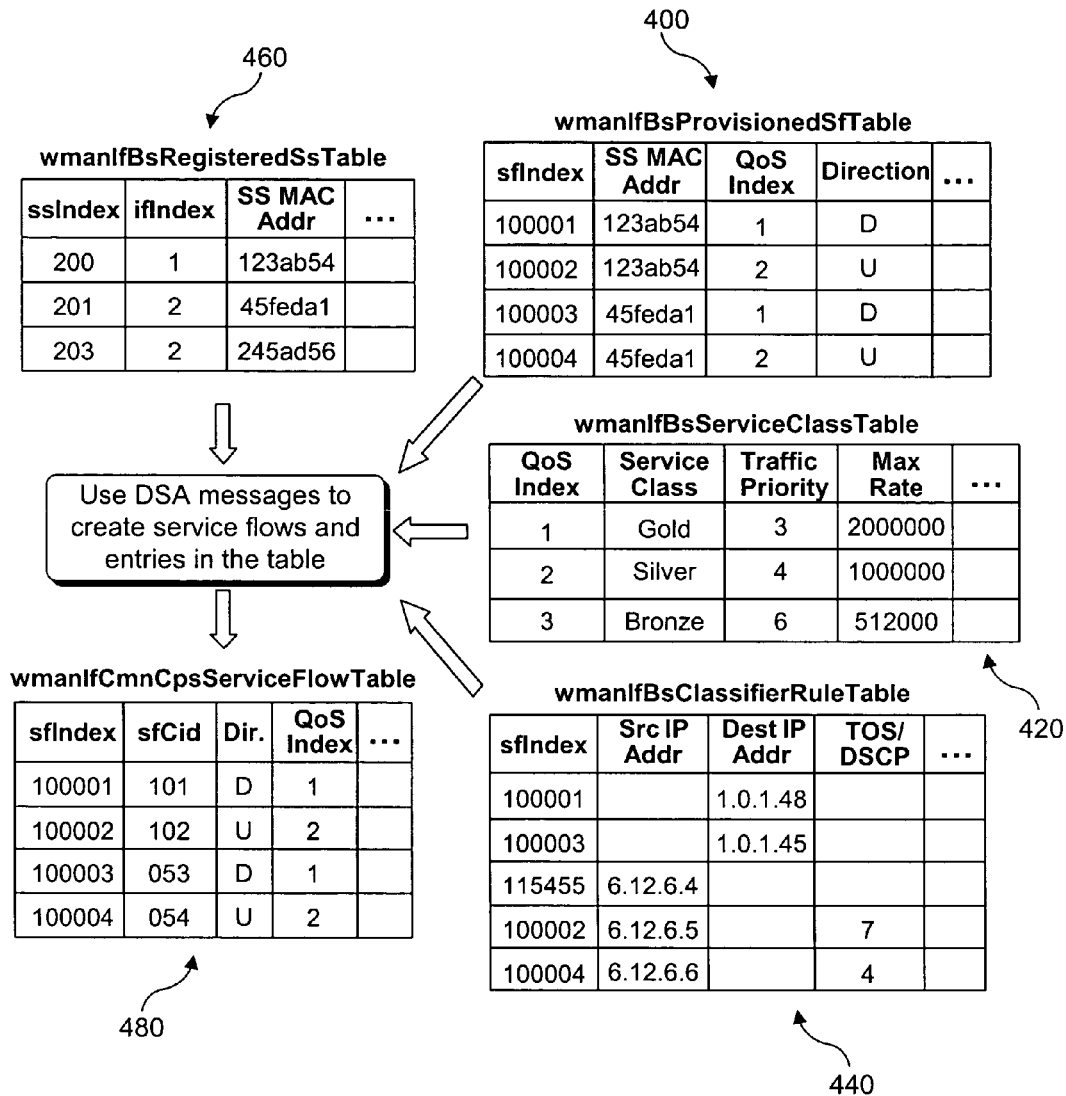
FIG. 7 is a schematic diagram illustrating an exemplary set of table entries made to the tables of FIGS. 4a-e during the service flow provisioning operations of FIG. 6.

FIG. 7 shows exemplary entries in the aforementioned tables 400, 420, 440, 460, and 480 corresponding to a provisioning process. As shown by smanIfBsProvisionedSfTable 400, two SS's, identified by respective MAC addresses of 0x123ab54 and 0x45fead1, have been pre-provisioned. Each SS has two dynamic service flows, identified by the values in the sfIndex field, with the associated QoS parameters that are identified by QoSIndex 1 and 2, respectively. As discussed above, a QoSIndex points to a QoS entry in the wmanIfBsServiceClassTable that contains QoS parameters. The wmanIfBsServiceClassTable 420 shown in FIGS. 6 and 7 includes three levels of QoS: Gold, Silver, and Bronze. The sfIndex values point to corresponding entries in wmanBsClassifierRuleTable 440 having the same sfIndex value. The entries in wmanBsClassifierRuleTable 440 indicate which rules shall be used to classify packets on the given dynamic service flow. wmanBsClassifierRuleTable 440 contains an entry that is indexed by sfIndex 100001, indicating a downlink service flow, and contains destination IP address 1.0.1.48. It means that the classifier in the BS will forward the packet with destination IP address 1.0.1.48, received from the RAN 102A, to the service flow with sfIndex 100001. wmanBsClassifierRuleTable 440 also contains an entry that is indexed by sfIndex 100002, indicating a uplink service flow, and contains source IP address 6.12.6.5, and TOS 7. It means that the classifier in the SS will transmit the packet with source IP address 6.12.6.5 and TOS 7 to the service flow with sfIndex 100002.

When the SS with MAC address 0x123ab54 registers into the BS, the BS creates an entry in wmanIfBaseRegisteredTable 460. Based on the MAC address, the BS will be able to find the service flow information that has been pre-provisioned in wmanIfBsProvisionedSfTable 400, wmanIfBsServiceClassTable 420, and wmanBsClassifierRuleTable 440.

In a block 610, the BS use Dynamic Service Addition (DSA) messaging to SS to create dynamic service flows for the corresponding sfIndex entries (e.g., 100001 and 100002), with the pre-provisioned dynamic service flow information. The BS and SS then create corresponding entries (e.g., two in the present example) in wmanIfCmnCpsServiceFlowTable 480, respectively. wmanIfCmnCpsServiceFlowTable 480 contains both service flow information and QoS parameters. Depending on the network condition, the QoS parameters in wmanIfCmnCpsServiceFlowTable 480 may correspond to a lower service level than what have been pre-provisioned in wmanIfBsProvisionedSfTable 400. The classifier rules will be created in the classifier rules table (not shown) in the BS and SS respectively. The dynamic service flows will then be available for the subscriber to send data traffic, as depicted by an end block 612.

Figure 8:
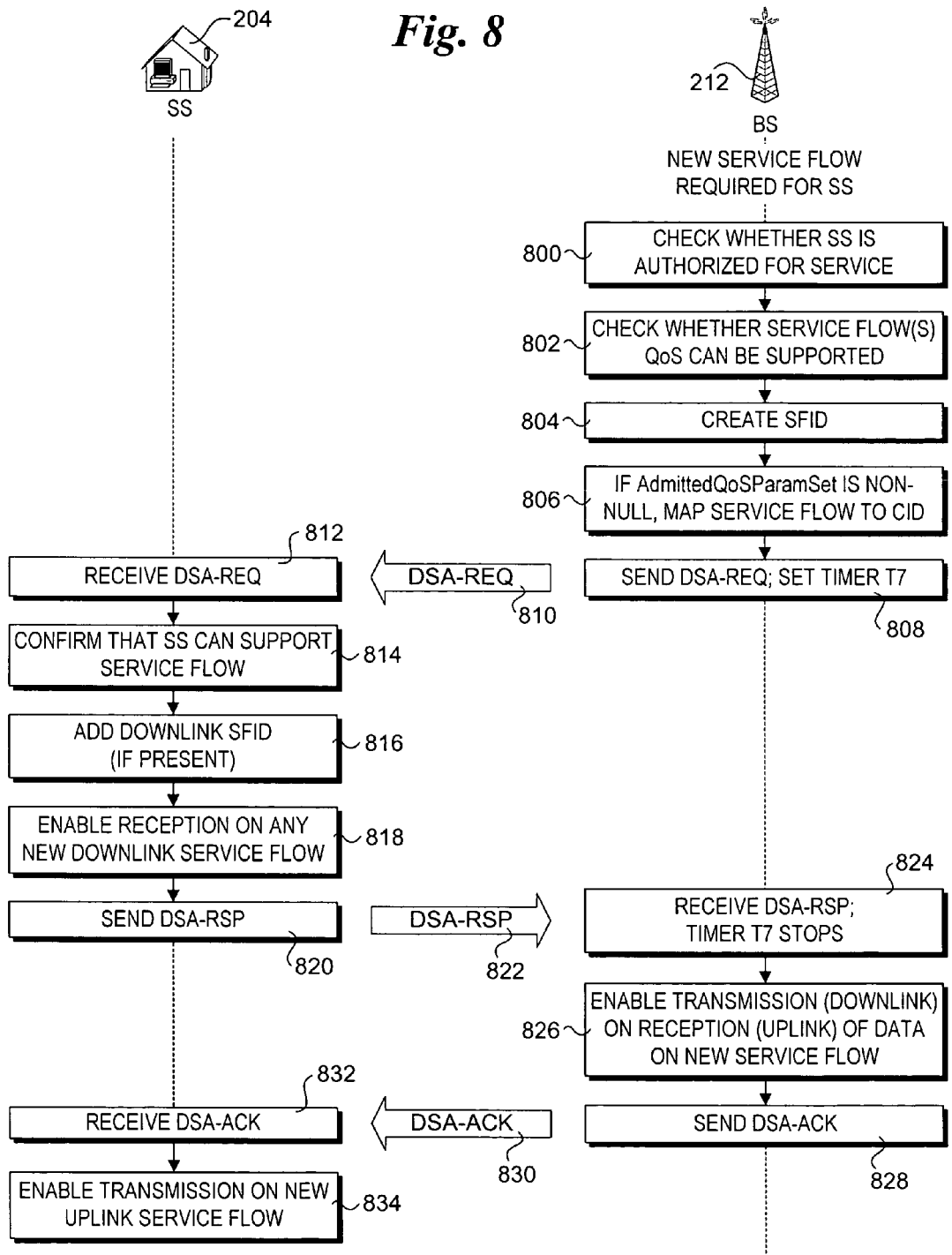
FIG. 8 is a message flow diagram illustrating operations and messages used to establish a service flow using dynamic service addition (DS) messaging.

Details of the operations performed when a BS 212 wishes to establish either an uplink or a downlink dynamic service flow with an SS 204 are shown in FIG. 8. The process begins in a block 800, wherein the BS checks whether the SS is authorized for service. In a block 802, the BS then checks whether the service flow(s) QoS requirements can be supported in view of current subscriber provisions for the BS (i.e., current air-link usage via the BS). If the service can be supported, the BS generates a new service flow identifier (SFID) in a block 804 and maps the service flow to a CID if the AdmittedQoSParamSet is non-null in a block 806. The BS then sends a DSA-REQ message 810 in a block 808 and sets its timer t7.

Upon receipt of the DSA-REQ message 810 in a block 812, SS 204 confirms whether it can support the service flow in a block 814. If so, it add a downlink SFID (if present) in a block 816, and enables reception on any new downlink service flow in a block 818. The SS then sends a DSA-RSP message 822 in a block 820 to BS 212.

Upon receipt of the DSA-RSP message, the BS stops its time T7 in a block 824. Then, in a block 826, the BS enables transmission (downlink) on reception (uplink) of data on the new service flow. In a block 828 the BS returns a DSK-ACK acknowledgement message to the SS, which receives the message in a block 832. In response, the SS enables transmission on the new uplink service flow in a block 834.

Details of the DSA message syntax can be found in Section 6.3.2.3.10 for DSA-REQ message, Section 6.3.2.3.11 for DSA-RSP message, and in Section 6.3.2.3.12 for DSA-ACK message in IEEE 802.16-2004 standard.

Figure 9:
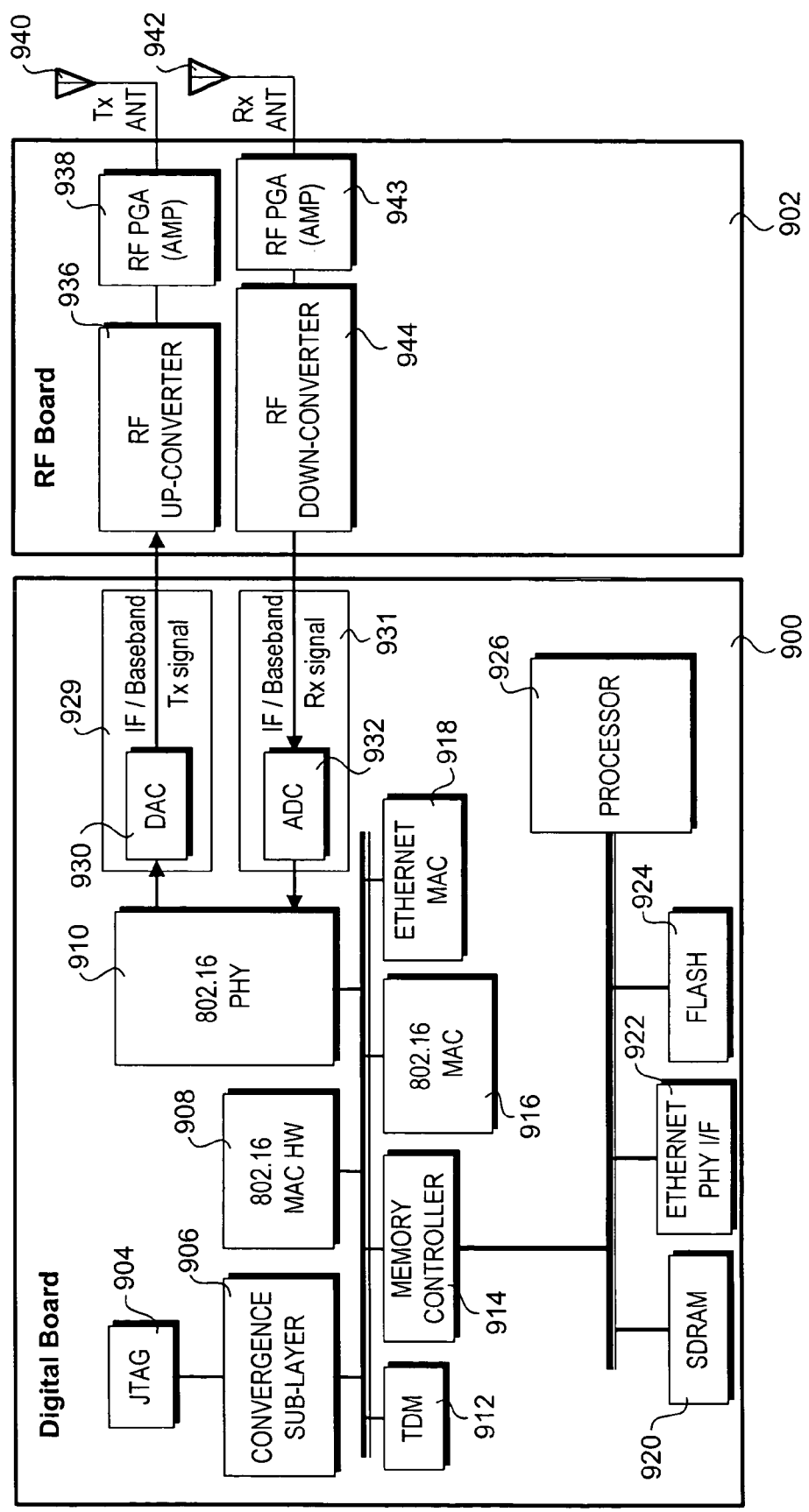
FIG. 9 is a schematic diagram of an apparatus that may be employed by a subscriber station or base station to perform aspects of the embodiments described herein.

FIG. 9 shows a block diagram of broadband wireless system architecture suitable for use as a subscriber station or base station under the IEEE 802.16-2004 specification. The architecture includes a digital board 900 and a radio frequency (RF) board 902. In general, digital board 900 is responsible for performing various process operations discussed herein. Meanwhile, RF board 902 handles the generation and reception of RF signals in accordance with the IEEE 802.16-2004 standard.

There are various building blocks and components employed by digital board 900 to facilitate its process operations. These include an optional Joint Test Action Group (JTAG) component 904, a convergence sub-layer 906, an IEEE P802.16-2004 MAC hardware block 908, an IEEE P802.16-2004 physical layer transceiver 910, a TDM component 912, a memory controller 914, an IEEE P802.16-2004 MAC layer 916, an Ethernet MAC block 918, synchronous dynamic random access memory (SDRAM) 920, an Ethernet physical interface 922, flash memory 924, and a processor 926.

Since digital board processes digital signals, while IEEE P802.16-2004 transmissions comprise analog signals, means are provided for interfacing between the two signal types. Furthermore, circuitry is needed to produce RF signals having appropriate baseband characteristics. These functions are facilitated by an IF (intermediate frequency)/Baseband transmitter (Tx) signal chip 929, which includes a digital-to-analog converter (DAC) 930 and an IF/Baseband receiver (Rx) signal chip 931 that includes an analog-to-digital converter (ADC) 932. DAC 930 chip converts digital signals generated by IEEE P802.16-2004 physical layer transceiver 910 into a corresponding analog signal. This signal is fed into an RF up-converter 936 on RF board 902, which up-converts the baseband signal frequency to the carrier frequency. The up-converted signal is then amplified via a programmable gain amplifier (PGA) 938, which outputs an amplified up-converted signal to a transmitter antenna 940.

Incoming IEEE P802.16-2004 transmission signals are received at a receiver antenna 942. The received signal is then amplified (as needed) via a PGA 943 and provided as an input to an RF down-converter 944, which down converts the received signal to the selected IF/Baseband frequency. The down-converted signal is then converted to a digital signal via ADC chip 932.

In general, processor 926 is representative of various types of processor architectures, including, but not limited to general-purpose processors, network processors, and microcontrollers. In addition, processor 926 is representative of one or more processing elements. The operations performed by the various digital board layers and components are facilitated by execution of instructions on one or more processing elements, including processor 926. Generally, the instructions may comprise firmware, software, or a combination of the two. In one embodiment, firmware instructions are stored in flash memory 924. In one embodiment, software instructions are stored in a storage device, such as a disk drive (not shown), that is connected to processor 926 via a disk controller (not shown). In one embodiment, all or a portion of the software instructions may be loaded as a carrier wave over a network, which interfaces to digital board 900 via Ethernet physical interface 922.

Thus, embodiments of this invention may be used as or to support a firmware and/or software modules executed upon some form of processing core or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

In addition to the configuration depicted in FIG. 9, the digital board 900 and RF board 902 functionality may be implemented via corresponding modules or that like that are embedded in a subscriber station or base station. For example, a PDA or laptop computer may include circuitry corresponding to digital board 900 and RF board 902 that is built into the device. In other embodiments, the digital and RF board functions may be supported by a peripheral add-on card or module, such as a PCI (peripheral component interconnect) expansion card for a desktop computer, or a PCMCIA card for a laptop computer.

In general, the size of the MIB data stored at a base station will be much larger than that maintained at a subscriber station. In both instances, the MIB data at the BS and SS will be a small subset of the data stored in service flow database 214. Typically, the SNMP agent operations may be implemented as a separate application running on an SS, or may be included as part of a 802.16 interface application used to access the network. The MIB data may be stored in a memory store or a disk drive or the like. A similar configuration may be employed for base stations. For larger MIB data requirements, it may be advantageous to employ a dedicated database server at a BS to server the MIB data.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for provisioning service flows in a broadband wireless network, comprising:
   identifying a subscriber station (SS) attempting to access the broadband wireless network, wherein the broadband wireless network employs an air interface defined by an IEEE (Institute of Electronic and Electrical Engineers) IEEE 802.16-based broadband wireless standard;
   retrieving service flow parameters corresponding to the SS, wherein the service flow parameters include dynamic service flow information corresponding to a desired level of service, the desired level of service including: a number of uplink/downlink (UL/DL) connections requested and data rates requested; and
   creating service flows for the SS based on the service flow parameters that are retrieved, the service flows enabling the SS to access the broadband wireless network.

2. The method of claim 1, further comprising:
   storing service flow parameters for respective subscribers in a service flow database hosted by a wireless service provider;
   obtaining an SS identifier at a base station (BS) in response to the SS attempting to access the broadband wireless network via the BS;

retrieving the service flow parameters from the service flow database based on the SS identifier and returning the service flow parameters that are retrieved to the BS; and storing the service flow parameters at the BS.

3. The method of claim 2, wherein the SS identifier is an SS Media Access Control (MAC) address.

4. The method of claim 2, further comprising:
enabling a subscriber to subscribe to a service offered by the wireless service provider via a service level agreement that identifies service flow attributes defining service flows to be provisioned for the subscriber when accessing the broadband wireless network;
storing the service flow attributes in the storage flow database to pre-provision the service for the subscriber.

5. The method of claim 2, further comprising:
storing service flow-related data in respective Management Information Base (MIB) data structures at the BS and the SS; and
employing (Simple Network Management Protocol) messages to access the MIB data structures.

6. The method of claim 1, wherein the service flow parameters include Quality of Service (QoS) parameters, the method further comprising:
associating respective sets of QoS parameters with a corresponding service class; and
enabling a set of QoS parameters to be applied for a provisioned service flow based on a service class specified for the service flow.

7. The method of claim 1, wherein creation of service flows is facilitated via a dynamic service addition (DSA) message exchange between the BS and the SS.

8. A method, comprising:
storing subscriber service flow provisioning information in a service flow database managed by a broadband wireless service provider, wherein the broadband wireless network employs an air interface defined by an IEEE (Institute of Electronic and Electrical Engineers) IEEE 802.16-based broadband wireless standard;
storing a sub-set of the subscriber service flow provisioning information in a Management Information Base (MIB) at a base station (BS) operated by the broadband wireless service provider; and
sending subscriber service flow provisioning information between the service flow database and the BS using SNMP (Simple Network Management Protocol) messages, wherein the service flow parameters include dynamic service flow information corresponding to a desired level of service, the desired level of service including: a number of uplink/downlink (UL/DL) connections requested and data rates requested.

9. The method of claim 8, further comprising:
storing a sub-set of the subscriber service flow provisioning information in a MIB at a subscriber station (SS) operated by a subscriber of the broadband wireless service provider; and
sending subscriber service flow provisioning information between the service flow database and the SS using SNMP (Simple Network Management Protocol) messages, wherein the BS is used as an SNMP proxy.

10. The method of claim 9, wherein the MIBs at the BS and SS include:
a group of BS objects corresponding to respective tables stored at a BS;
a group of SS objects corresponding to respective tables stored at an SS; and
a group of common objects corresponding to respective tables stored at a BS or SS.

11. The method of claim 9, further comprising:
employing SNMP agents at the BS and SS to manage the MIBs at the BS and SS.

12. The method of claim 8, wherein the MIB at the base station includes a service class table that associates sets of Quality of Service (Qos) parameters with corresponding service classes to enable a set of QoS parameters to be applied for a provisioned service flow based on a service class specified for the service flow.

13. A machine-readable medium encoded with computer-executable instructions executed at a base station (BS) of a broadband wireless network perform operations comprising:
identifying a subscriber station (SS) attempting to access the broadband wireless network via the base station (BS), wherein the broadband wireless network employs an air interface defined by an IEEE (Institute of Electronic and Electrical Engineers) IEEE 802.16-based broadband wireless standard;
sending a request to a service flow database to obtain pre-provisioned service flow parameters corresponding to the SS; and
creating service flows for the SS to enable the SS to access the broadband wireless network based on the service flow parameters that are retrieved, wherein the service flow parameters include dynamic service flow information corresponding to a desired level of service, the desired level of service including: a number of uplink/downlink (UL/DL) connections requested and data rates requested.

14. The machine readable medium of claim 13, wherein execution of the instructions performs further operations including:
storing the service flow parameters for the SS in a Management Information Base (MIB) hosted by the BS.

15. The machine readable medium of claim 13, wherein execution of the instructions performs further operations including:
enabling the MIB to be managed using SNMP (Simple Network Management Protocol) messages, wherein a portion of the instructions comprise an SNMP agent.

16. The machine readable medium of claim 13, wherein execution of the instructions performs further operations including:
enabling the BS to function as an SNMP proxy to facilitate communication between a network management system linked in communication with the BS and the SS.

17. The machine readable medium of claim 13, further to provide a data structure corresponding to the MIB.

18. An apparatus, comprising:
a processor;
a broadband wireless network interface including a plurality of broadband wireless network components compliant with an IEEE (Institute of Electronic and Electrical Engineers) 802.16-based broadband wireless standard, operatively coupled to the processor, the broadband wireless components to facilitate communications over an IEEE P802.16-based broadband wireless network;
second network interface, operatively coupled to the processor; and at least one storage device, operatively coupled to the processor and having instructions stored therein, which when executed by the processor perform operations including:

authenticating a subscriber station (SS) attempting to access the broadband wireless network via the BS, the authentication including obtaining a SS identifier;

sending a request to a service flow database over the second network interface to obtain pre-provisioned service flow parameters corresponding to the SS, wherein the service flow parameters include dynamic service flow information corresponding to a desired level of service, the desired level of service including: a number of uplink/downlink (UL/DL) connections requested and data rates requested; and creating service flows for the SS to enable the SS to access the broadband wireless network based on the service flow parameters that are retrieved.

19. The apparatus of claim 18, comprising further instructions, stored in said at least one storage device, to perform operations comprising:

storing the service flow parameters for the SS in a Management Information Base (MIB) hosted by or accessible to the apparatus.

20. The apparatus of claim 18, comprising further instructions, stored in said at least one storage device, to perform operations comprising:

enabling the MIB to be managed using SNMP (Simple Network Management Protocol) messages.

21. The apparatus of claim 18, wherein the apparatus comprises an expansion card for a computer system.

22. The apparatus of claim 18, wherein the apparatus comprises a module configured to be installed in a computing device.

23. A system, comprising:

a network management system, to manage flow provisioning in a broadband wireless network, wherein the broadband wireless network employs an air interface defined by an IEEE (Institute of Electronic and Electrical Engineers) IEEE 802.16-based broadband wireless standard;

a service flow database, linked in communication with the network management system;

a plurality of base stations (BS), each linked in Communication with the network management system and the service flow database, a base station having software accessible thereto, which when executed performs operations including:

identifying a subscriber station (SS) attempting to access the broadband wireless network via the BS;

sending a request to obtain pre-provisioned service flow parameters corresponding to the SS, wherein the service flow parameters include dynamic service flow information corresponding to a desired level of service, the desired level of service including; a number of uplink/downlink (UL/DL) connections requested and data rates requested; and creating service flows for the SS to enable the SS to access the broadband wireless network based on the service flow parameters that are retrieved.

24. The system of claim 23, further comprising:

a Management Information Base (MIB), hosted by a base station, the MIB to store service flow parameters corresponding to a plurality of subscriber stations, wherein execution of the software instructions enables subscriber service flow provisioning information to be sent between the BS and the service flow database using SNMP (Simple Network Management Protocol) messages.

25. The system of claim 23, wherein execution of the software instructions at the BS further enables the BS to operate as an SNMP proxy via which SNMP messages are relayed from the network management system to a subscriber station linked in communication with the BS.

26. The system of claim 23, wherein the MIB includes a provisioned service flow table and a service class table that enable, combined with execution of the software instructions at the BS, Quality of Service (QoS) parameters for a given service flow to be specified via a service class.

* * * * *